Sept. 26, 1967  G. DE COYE DE CASTELET  3,344,294

ADJUSTABLE POLE PITCH DYNAMOELECTRIC MACHINE

Filed March 11, 1965  2 Sheets-Sheet 1

Inventor
Gaëtan De Coye De Castelet
By Stevens, Davis, Miller & Mosher
Attorneys Inventor
Gaëtan De Coye De Castelet
By Stevens, Davis, Miller & Mosher
Attorneys United States Patent Office 3,344,294
Patented Sept. 26, 1967

3,344,294
ADJUSTABLE POLE PITCH DYNAMOELECTRIC MACHINE
Gaëtan de Coye de Castelet, Billancourt, France, assignor to Regie Nationale des Usines Renault, Billancourt, France, French works
Filed Mar. 11, 1965, Ser. No. 438,902
Claims priority, application France, Mar. 19, 1964, 967,998, Patent 1,397,442
5 Claims. (Cl. 310—191)

ABSTRACT OF THE DISCLOSURE

A servo-control device for controlling engine power transmission systems dependent upon the output voltage of an alternator having a part of its stator poles angularly shiftable in response to engine load.

This invention relates to servo-control devices controlling engine power transmission on motor vehicles in particular, such servo-control being obtained with the aid of an alternator whose output voltage is a function, on the one hand, of the speed of the vehicle or the rotation speed of the engine and, on the other hand, of the load on the engine, thereby permitting the automatic adapting of the demultiplication ratio between the engine and the output drive shaft either continuously or discontinuously.

Generally in such devices, the rotor or the stator of a tachometer-type alternator with a permanent magnet moves axially one in relation to the other as a function of the engine load.

The chief advantages of this arrangement is the absence of all rubbing or sliding contacts involved by the introduction of the engine load factor into operation of the alternator, and, due to the absence of any additional resistance in series, an internal resistance of the alternator that is reduced to a minimum.

Similar action by the load factor can be achieved, not by a sliding movement affecting the rotor or the stator (which calls for good mechanical precision), but by an angular shift of a part of the stator poles—an arrangement which is easier to obtain.

The present invention has for its object an alternator of this type, characterized in that the said angular shift governed by the engine load affects the angular position of poles of the same polarity relatively to the poles of opposite polarity.

The invention is further characterized by the disposition and shape of the poles, which permits obtaining the desired law of variation of the alternator output voltage as a function of the engine load.

In order to permit a displacement of the alternator poles of identical polarity relatively to the other poles with the required degree of smoothness, and in order also to be able to possibly nullify the output voltage, the shape of the poles must be such that no interpenetration occurs, that is to say that each pole must cover only approximately half the length or thickness of the magnet.

In its position of maximum useful flux, a tachometer-type alternator according to the invention can therefore deliver only about one-half the voltage of a conventional machine, regardless of whether the poles are trapezium, triangle, escalator or otherwise shaped.

However, experience shows that such an alternator is not bulkier than a machine in which the rotor and the stator can be mutually shifted by sliding. This can be attributed to the hollow spaces which such a machine must necessarily contain.

The description which follows of a preferred embodiment, given with reference to the accompanying non-limitative exemplary drawing, will give a clear understanding of how the invention can be carried into practice.

Figure 1:
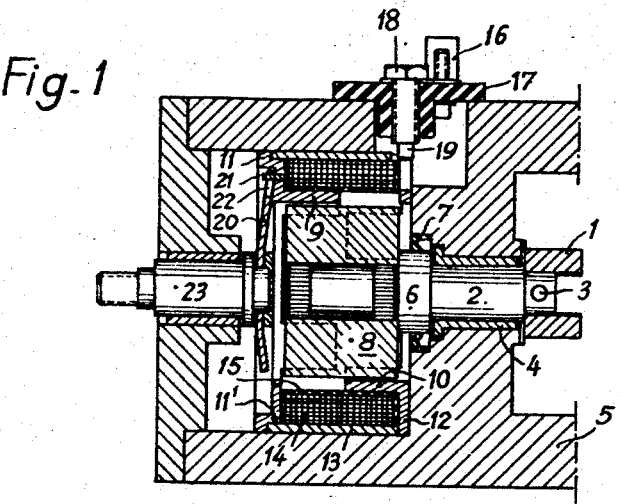
FIGURE 1 shows in axial section an alternator according to the invention having a single-coil stator whose axis is the same as that of the rotor magnet.

Reference is first had to FIGURE 1, in which the so-called "screwdriver"-type coupling between the alternator and a gearbox output shaft or a vehicle engine shaft is effected by means of a slotted member 1 which, through the medium of a pin 3, drives the alternator rotor shaft 2. The slotted member 1 and the pin 3, being provided with the necessary working clearances, constitute an Oldham half-joint. The shaft 2 rotates in a sintered-metal bearing 4 supported in a casing 5 made of non-magnetic material and enclosing the alternator. The shaft 2 has a shoulder 6 formed thereon which, in conjunction with a lipped seal 7 carried by the casing 5 ensures leaktightness of the alternator.

Beyond the shoulder 6, the shaft 2 carries a multipole magnet 8 which is magnetized alternately north and south over its perimeter. The magnet 8 may bear, for instance, three north poles and three south poles. The stator pole-pieces are shaped as short fingers made of magnetically soft material, each covering less than half the length of the magnet. There are three left-hand fingers 9 and three right-hand fingers 10 which, when the flux is maximum, are equidistant (the fingers 9 being north and the fingers 10 south, for example). These fingers are extended in the manner well-known per se by rings 11 and 12, the magnetic circuit being closed through a barrel 13 which surrounds a coil 14 mounted on an insulating frame 15 whose inner diameter is slightly greater than the outer diameter of the fingers 9 so as to allow the latter to move readily. The coil outputs are through tabs 16 fixed to an insulating support 17 which is in turn secured to the case by a screw 18 whose tip 19 angularly restrains at the same time the stationary pole-pieces 10 and the rings 12.

The angular position of the ring 11 and of the pole-pieces 9 is controlled through the agency of a part 20 forming a nearly flat spring composed of three arms each of which is slotted as at 22 to accommodate a peg 21 fixed to the ring 11, which ring is flanged as at 11$^1$. This flange restrains the ring 11 radially and axially in relation to the ring 13. Either of the parts 11 or 13 may with advantage be made of oil-impregnated sintered metal.

The spring 20 is fixed (by crimping, for instance) to a shaft 23 whose angular position is governed by the engine load and which forms part, say of the linkage to the accelerator pedal.

Figure 2:
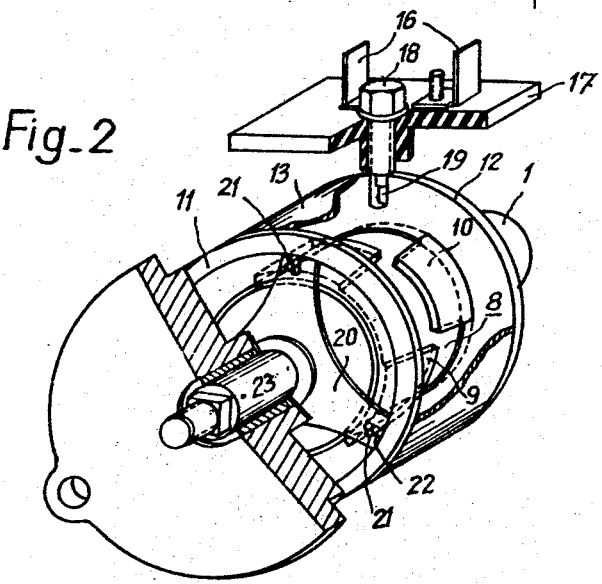
FIGURE 2 is a perspective view with a partial cutaway of the alternator of FIGURE 1.

Most of the parts shown in FIGURE 1 are also to be found in FIGURE 2. In this figure, the major part of the casing 5 and the barrel 13 has been cut away for greater clarity. The shape of the pole-pieces 9 and 10 and that of the spring 20 is clearly visible.

Figure 3:
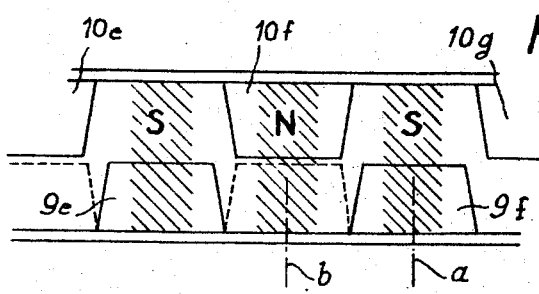
FIGURE 3 is a partial developed view of the stator pole-pieces and the magnet poles, intended to clearly specify the dimensional ratios used and the manner of operation.

Reference is next had to FIGURE 3 for a developed view of the rotor and stator pole-pieces. This figure reveals three stationary pole-pieces 10e, 10f, 10g and two movable pole pieces 9e and 9f. The shaded areas on FIGURE 3 represent those portions of the developed surface of the magnet which have marked polarization.

When the pole-pieces 9 occupy the position a, the flux is at a maximum in the stationary and movable pole-pieces alike, and the alternator voltage is at a maximum.

When the pole-pieces 9 occupy the position b, the pieces 9 and 10 receive a flux of identical sign and the alternator voltage is zero.

In the intermediate positions, the voltage also takes on an intermediate value.

By observing suitable dimensional ratios between the useful width of the magnet poles and the size of the trapeziums forming the stator pole-pieces, it is possible not only to retain a sinusoidal alternator waveform but also to obtain the desired law of voltage variation with angular shift. More particularly, it is possible to obtain a zone at near-maximum flux, wherein rotation of the shaft 23 has but little influence on the voltage. Such an arrangement is advantageous for controlling gear changes on automatic vehicle transmission systems in which, in order to avoid accidental gear changes, it is desirable to dispose of a zone of substantially constant voltage extending over approximately 30% of the total angle chosen.

In one possible constructional form of a six-pole alternator, each magnet pole occupies an angle of 30° and is separated from its neighbouring poles by a 30-degree interval on either side. The longer base of the trapezium of each of the pole-pieces 9 and 10 represents an angle of 58°, and its shorter base an angle of 50 degrees. The diameter of the magnet measures 1.45 times its length, the single air-gap being equal to 0.03 times the radius of the rotor.

The foregoing values are given by way of example only and are not to be considered as being in any way limitative of the invention.

One of the advantages of this form of embodiment with short trapezoidal fingers is that the latter are easier to obtain by swaging than long fingers occupying the entire length of the magnet, as is the case for instance with alternators with a sliding rotor or stator. Leading out the wires from such an alternator with angularly-shiftable poles raises no special problems.

Figure 4:
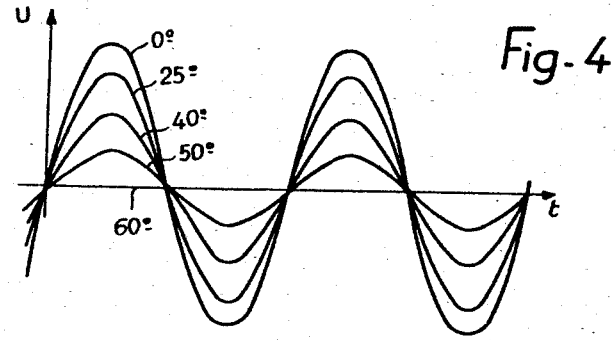
FIGURE 4 is a reproduction of an oscillogram showing the alternator output voltage as a function of time, for a rotation speed of 2000 r.p.m., in the case of a six-pole alternator.

Reference is now had to FIGURE 4 for the reproduction of an oscillogram of the voltage delivered by the alternator of FIGURE 1 in its six-pole version, as a function of time, for five different angular settings of the movable pole-pieces 9, to wit 0°, 25°, 40°, 50° and 60°, the 0° setting corresponding to equidistant interspersed poles.

Figure 5:
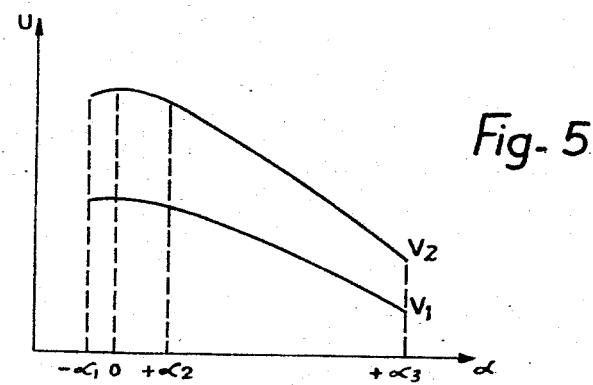
FIGURE 5 is a graph in which the alternator output voltage is plotted against the angular shift of the stator pole-pieces, for two different rotor rotation speeds.

In FIGURE 5, the alternator voltage is plotted against the angular shift α for two different rotational speeds V1 and V2.

Figure 6:
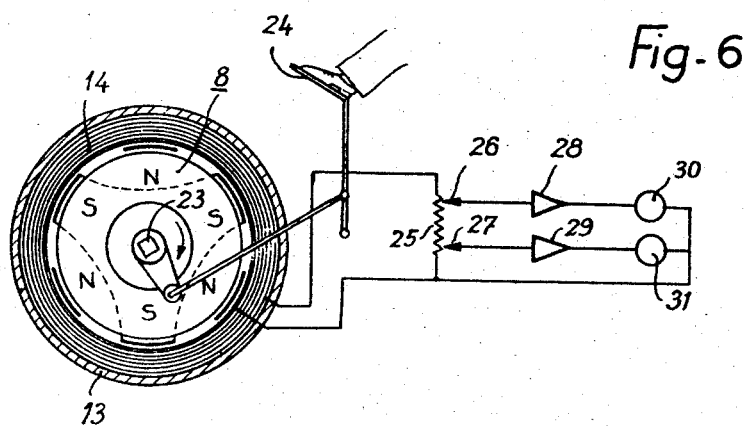
FIGURE 6 is a circuit diagram showing a device according to the invention applied for controlling gear changes in a two speed-automobile gearbox.

FIGURE 6 represents the basic electric circuit diagram for a device according to the invention, as applied for controlling gear changes in a two-speed automobile gearbox.

The magnet 8 rotates in liaison with an engine or gearbox shaft in front of the coil 14 whose voltage is dependent upon the angular position of the shaft 23 linked to the vehicle accelerator pedal 24. The coil 14 feeds a potentiometer 25 having two cursors 26 and 27, the voltage from which is rectified and amplified by threshold amplifiers 28 and 29 and controls, in known manner, engagement or disengagement of the gear ratios through the medium of electromagnets 30 and 31.

What is claimed is:

1. In a servo-control device for controlling engine power transmission systems, particularly on motor vehicles, and having a heteropolar alternator whose radial rotating field magnet is of the permanently magnetized type with a single stator armature coil coaxial with the rotor and with stator pole-pieces alternately connected to one or the other of two plates cooperating with an annular casing for closing the magnetic circuit and containing the armature coil, the improvement comprising one of said sets of pole pieces being angularly shiftable with respect to the other pole piece set for varying the alternator voltage in relation to rotation speed.

2. A device according to claim 1, wherein the stator pole-pieces cover a little less than the length of the rotor in such manner as to permit rotating one of said plates through a full-pole step relatively to the other.

3. A device according to claim 2, wherein said pole-pieces are trapezium-shaped.

4. A device according to claim 3, when the alternator has six poles each of said six poles appearing on the cylindric surface of the field magnet as six angularly equidistant operative zones, and each of which covers a 30° arc thereon, wherein the longer and shorter bases of the trapezium-shaped stator pole-pieces cover arcs of 58° and 50° respectively on the air gap, and wherein the rotor is a single cylindrical magnet whose diameter is 1.45 times its length and the single air gap is equal to 0.03 times the radius of the magnet, the aforementioned values being adoptable within limits of plus or minus 5%.

5. A device according to claim 1, applied to the control of an automobile power transmission system, wherein the rotor is driven at a speed proportional to that of the engine or the vehicle, wherein means are provided for controlling the mutual angular shift of said two stator plates by the accelerator pedal, and wherein a device such as a clutch or gear-box is controlled by the alternator output voltages.

References Cited

UNITED STATES PATENTS 2,629,063  2/1953  Ellis _____ 310—191 X

MILTON O. HIRSHFIELD, *Primary Examiner.*

L. L. SMITH, *Assistant Examiner.*